M. A. & E. F. SEISEL.
STEERING GEAR FOR AUTOMOBILES.
APPLICATION FILED NOV. 6, 1912.
1,148,864.
Patented Aug. 3, 1915.
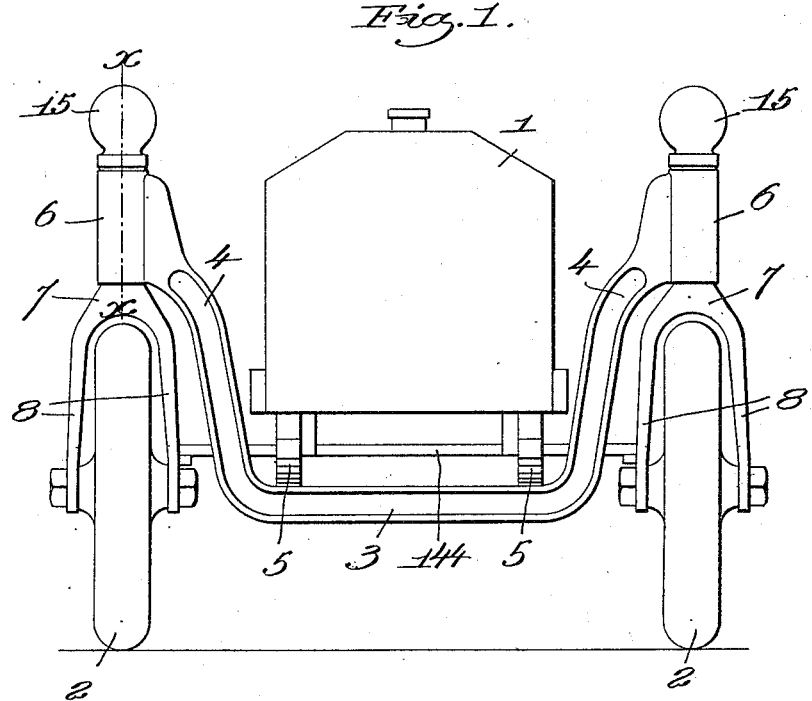
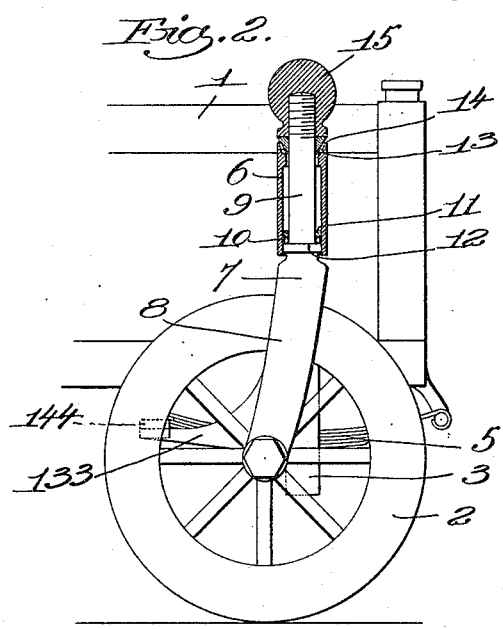
Witnesses:
Inventors:
Max A. Seisel,
Emil F. Seisel,
by Edwards Hand & Smith
Attys.

UNITED STATES PATENT OFFICE.

MAX A. SEISEL, OF BOSTON, AND EMIL F. SEISEL, OF NORWOOD, MASSACHUSETTS.

STEERING-GEAR FOR AUTOMOBILES.

1,148,864. Specification of Letters Patent. Patented Aug. 3, 1915.

Application filed November 6, 1912. Serial No. 729,781.

*To all whom it may concern:*

Be it known that we, MAX A. SEISEL and EMIL F. SEISEL, citizens of the United States, and residents of Boston, county of Suffolk, State of Massachusetts, and Norwood, county of Norfolk, State of Massachusetts, respectively, have invented an Improvement in Steering-Gears for Automobiles, of which the following description, in connection with the accompanying drawing, is a specification, like characters on the drawing representing like parts.

This invention relates to automobile steering gear and has for its object to provide a novel steering gear which is simple in construction, which is safe in operation, and by means of which the automobile can be very easily steered even when passing over rough roads.

One embodiment of the invention will first be described and then the novel features thereof will be pointed out in the appended claims.

Referring to the drawings, Figure 1 is a front view of an automobile embodying the invention; Fig. 2 is a partial side view and part section on the line x—x, Fig. 1.

1 designates the body of an automobile, 2 the front or steering wheels thereof, and 3 is the front axle. The automobile body 1 is sustained on the front axle 3 in usual manner by means of springs 5. The ends of the axle are provided with the upwardly-directed portions 4, each of which is provided at its end with a vertical bearing 6 situated directly above the corresponding steering wheel 2. Each steering wheel is journaled in a forked member 7, said member having the forked portion 8 which receives the wheel 2 and which sustains the spindle on which the wheel turns. Each forked member is also provided with the upwardly-directed spindle or stem 9 which extends through the bearing 6 and is journaled therein. Ball bearings 10 will preferably be employed between the spindle 9 and the bearing 6. In the embodiment of the invention shown each bearing 6 is provided with an internal shoulder 11 forming the track against which the balls 10 run and the forked member 7 is formed with the shoulder 12 on which the balls have bearing. Another ball bearing 13 is provided at the upper end of the hub or bearing 6, the balls of said ball bearing being held in place by the cone member 14 which is screwed onto the spindle.

15 designates a cap nut applied to the upper end of the spindle which serves not only as a lock nut, but also constitutes an ornamentation. This construction provides a comparatively long bearing for the spindle 9 which is of advantage because of the strength and rigidity which it gives to the steering gear. The forked portion 8 inclines rearwardly so that the axis about which the wheels revolve is situated in the rear of the axial line of the spindle 9. The advantage of this construction is that there will be no tendency to turn the steering wheels about their vertical axis when one or the other of them strikes an obstruction. Moreover, by giving the forks this shape the wheels can be turned easier and with less effort than if the horizontal axis about which the wheel revolved intersected the vertical axis of the spindle 9.

The inner arm of each of the forks 8 is provided with a rearwardly-extending finger 133, and said fingers are pivotally connected to a steering rod 144 which is geared to the steering wheel by any suitable or usual mechanism so that when the steering wheel is turned the steering rod 144 will be moved longitudinally in one direction or the other thereby turning the steering wheels.

The principal feature of the invention lies in supporting the wheels in forked members 7 which are journaled above the wheels and in making the forked portions 8 of these forked members rearwardly inclined so as to bring the horizontal axis about which the wheels revolve in the rear of the vertical axis of the spindle 9.

Various changes in the constructional features of the device may be made without departing from the invention.

Having fully described our invention, what we claim as new and desire to secure by Letters Patent is:—

1. In a steering gear for automobiles, the combination with a front axle having upwardly-directed ends provided with vertical bearings, of forked members having stems journaled in said bearings and forked portions to receive the steering wheels, said forked portions being rearwardly inclined so as to bring the horizontal axis about which the steering wheels revolve to the rear of the vertical axis of the stem, one arm of each fork having a rearwardly-extended finger and a steering rod connecting said fingers.

2. In a steering gear for automobiles, the combination with a front axle having upwardly-directed ends, each provided with a vertical bearing, each bearing having at its lower end an internal shoulder to constitute a ball race, and a ball race at its upper end, of forked members having forked portions to receive the steering wheel, and stems extending through said bearing, each stem having a collar beneath the internal shoulder, balls between said collars and shoulders, balls in the upper ball race, a cone member mounted on each stem at the upper end and bearing against the balls on the upper ball race, a nut on the upper end of each stem above the bearing, the forked portions of each steering wheel inclining downwardly and rearwardly thereby to bring the horizontal axis of each wheel to the rear of the vertical axis of the stem, one arm of each fork having a rearwardly-extending finger, and a steering rod connecting said fingers.

In testimony whereof, we have signed our names to this specification, in the presence of two subscribing witnesses.

MAX A. SEISEL.
EMIL F. SEISEL.

Witnesses:
BESSIE G. MORRIS,
THOMAS J. DRUMMOND.

Copies of this patent may be obtained for five cents each, by addressing the "Commissioner of Patents. Washington, D. C."